United States Patent [19]

Indeck et al.

[11] Patent Number: 5,408,505
[45] Date of Patent: Apr. 18, 1995

[54] METHOD AND APPARATUS FOR PROCESS CONTROL, TENSION CONTROL, AND TESTING OF MAGNETIC MEDIA

[75] Inventors: Ronald S. Indeck, Olivette; Marcel W. Muller, St. Louis, both of Mo.

[73] Assignee: Washington University, St. Louis, Mo.

[21] Appl. No.: 145,943

[22] Filed: Oct. 29, 1993

Related U.S. Application Data

[63] Continuation-in-part of Ser. No. 46,040, Apr. 9, 1993, Pat. No. 5,365,586.

[51] Int. Cl.⁶ .............................................. H04L 9/00
[52] U.S. Cl. ........................................ 380/4; 380/23; 380/25; 360/71
[58] Field of Search ............................ 380/4, 23, 25; 360/73.05, 71

[56] References Cited

U.S. PATENT DOCUMENTS

| | | |
|---|---|---|
| 4,038,596 | 7/1977 | Lee . |
| 4,806,740 | 2/1989 | Gold et al. . |
| 4,906,988 | 3/1990 | Copella . |
| 4,985,614 | 1/1991 | Pease et al. . |
| 5,027,113 | 6/1991 | Bonnaval-Lamothe et al. . |
| 5,159,182 | 10/1992 | Eisele . |
| 5,177,344 | 1/1993 | Pease . |

OTHER PUBLICATIONS

"Noise Correlation of Magnetic Thin Film Media" by Mian et al., *Japanese Journal of Applied Physics*, vol. 30, No. 8B, Aug. 1991, L1483–85.

"Determination of a Track's Edge by Differential Power Spectrum" by Indeck et al., *Japanese Journal of Applied Physics*, vol. 31, No. 8A, Aug. 1992, L1065–L1067.

"Spatial Noise Phenomena of Longitudinal Magnetic Recording Media" by Hoinville et. al., *IEEE Transactions on Magnetics*, vol. 28, No. 6, Nov. 1992, 3398–3406.

"Measurements of Modelling of Noise in DC-Erased Thin-Film Media" by Vos et al., *IEEE Transactions on Magnetics*, vol. 26, No. 5, Sep. 1990, 2149–51.

"Spatial Structure of Media Noise In Film Disks" by Yarmchuk, *IEEE Transactions on Magnetics*, vol. Mag-22, No. 5, Sep. 1986, 877–82.

"Noise From Unsaturated DC Erasure and Peak Shift of Signals in Longitudinal Thin-Film Disk Media" by Ohara et al., *IEEE Transactions on Magnetics*, vol. Mag-23, No. 5, Sep. 1987, 2380–82.

"Novel Applications of Cryptography in Digital Communications" by Omura, *IEEE Communications Magazine*, May 1990, 21–29.

"A Physically Based Approach to Information Theory for Thin Film Magnetic Recording" by O'Sullivan et al., *Proceedings of the Thirtieth Allerton Conference on Communication, Control, and Computing*, Oct. 1992.

"Transverse Correlation Length in Thin Film Media" by Mian et al., *IEEE Transactions on Magnetics*, vol. 28, No. 5, Sep. 1992, 2733–35.

"A Magnetoresistive Gradiometer" by Indeck et al., *IEEE Transactions on Magnetics*, vol. 24, No. 6, Nov. 1988, 2617–19.

"An Analysis of Multilayered Thin-Film Magnetic Field Gradiometers Having a Superconducting Spacer" by Indeck. *Journal of The Magnetics Society of Japan*, vol. 13, Supplement, No. S1 (1989), 599–604.

(List continued on next page.)

*Primary Examiner*—David C. Cain
*Attorney, Agent, or Firm*—Rogers, Howell & Haferkamp

[57] ABSTRACT

A method and apparatus is disclosed for using the remanent noise of a magnetic medium as a fingerprint for benchmark testing of the magnetic medium as it is both manufactured and used. A cross-correlation is made between the fingerprint at various times as the magnetic medium is manipulated and is indicative of the integrity thereof. This cross-correlation media may be used to control manufacturing and recording processes, including tape tensioning and channel equalization. This cross-correlation between fingerprints can be used to control the tension applied to a thin film magnetic medium during record and/or playback.

14 Claims, 1 Drawing Sheet

OTHER PUBLICATIONS

"Interaction Factors of a Multi-Layered Magnetic Thin Film System" by Mian et al., *IEEE Transactions on Magnetics*, vol. 26, No. 5, Sep. 1990, 2415–17.

"An interaction matrix for the energy analysis of an n-layered magnetic thin-film system" by Mian et al., *Journal of Magnetism and Magnetic Materials* 96 (1991), 248–60.

"dc track edge interactions" by Indeck et al., *Journal of Applied Physics*, 69(8), Apr. 1991, 4721–23.

"Track edge fluctuations" by Muller et al., *Journal of Applied Physics*, 67(9), May 1990, 4683–85.

"In Situ Measurement of the Remanence Curve of Magnetic Recording Media" by Hoinville et al., *IEEE Transactions on Magnetics*, vol. 24, No. 6, Nov. 1988, 2976–78.

"An in situ measurement of intergranular coupling in magnetic film media" by Mian et al., *Journal of Applied Physics*, 73(4), Feb. 1993, 2027–28.

"Noise Characterization of Perpendicular Media" by Indeck et al., *Journal of the Magnetics Society of Japan*, vol. 15, Supplement, No. S2 (1991), 173–78

"Authentication of Forensic Audio Recordings" by Koenig. *Journal of the Audio Engineering Society*, vol. 38, No. 1/2, 1990, 3–33.

"Smart-card applications' hidden problems add to designers' challenges" by Legg, *EDN*, Mar. 1992, 83–90.

"Smart cards gear up for belated success" by Legg, *EDN*, Oct. 1991, 51–58.

*Interaction Factors of a Multi-Layered Magnetic Thin Film System*, by Mian, Indeck. *IEEE Transactions on Magnetics*, vol. 26, No. 5, pp. 2415–2417, Sep. 1990.

*An interaction matrix for the energy analysis of an n-layered magnetic thin-film system*, by Mian, Indeck. *Journal of Magnetism and Magnetic Materials*, 96 (1991) 248–260.

*dc track edge interactions*, by Indeck, Reising, Hoinville, Muller. *Journal of Applied Physics*, 69 (8), pp. 4721–4723, Apr. 19911.

*Track edge fluctuations*, by Muller, Indeck. *Journal of Applied Physics*, 67 (9), pp. 4683–4685, 1 May 1990.

*In Situ Measurement of the Remanence Curve of Magnetic Recording Media*, by Hoinville, Ornes, Murdock, Muller. *IEEE Transactions on Magnetics*, vol. 24, No. 6, pp. 2976–2978, Nov. 1988.

*An in situ measurement of intergranular coupling in magnetic film media*, by Mian, Indeck, Muller. *Journal of Applied Physics*, 73 (4), pp. 2027–2028, 15 Feb. 1993.

*Noise Characterization of Perpendicular Media*, by Indeck, Johnson, Mian, Hoinville, Muller. *Journal of the Magnetics Society of Japan*, vol. 15 Supplement, No. S2, pp. 173–178 (1991).

METHOD AND APPARATUS FOR PROCESS CONTROL, TENSION CONTROL, AND TESTING OF MAGNETIC MEDIA

CROSS-REFERENCE TO RELATED APPLICATION

This application is a continuation-in-part of U.S. Ser. No. 08/046,040, filed Apr. 9, 1993, now U.S. Pat. No. 5,365,586, issued Nov. 15, 1994.

BACKGROUND AND SUMMARY OF THE INVENTION

The sources of noise in a readback signal from a magnetic recording medium have been investigated and identified. One of those sources includes the irregularities and defects in the microstructure of the magnetic medium itself. For many years, the noise generated from this source has been thought, as with the noise generated from other identified sources, to be random and subject only to statistical analysis for its treatment. The inventors herein have recently demonstrated that this noise component is instead deterministic, i.e. is permanent and repeatable, depending entirely on the head-medium position and on the magnetic history of the medium. As confirmed by experiments conducted by the inventors herein, when the medium has had no signal written on it and has been recorded only with DC fields, the observed readback signals are almost identical. The magnetic contribution to the readback signal under these conditions results from spatial variations in the medium's magnetization: magnetic domains, ripple, local fluctuations of the anisotropy field and saturation magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors herein, a magnetic medium may be DC saturated and its output then measured to determine the noise of its remanent state. The inventors have confirmed that this remanent noise is a function of the magnetic microstructure by comparing the remanent noise after a positive DC saturation with the remanent noise after a negative DC saturation. It has been found that these wave forms are virtual "mirror images" of each other thereby demonstrating a close correlation. Similarly, other methodologies were used to confirm that the remanent noise was determinative, repeatable, and related to the physical microstructure of the magnetic medium itself. Remanent noise arising from the permanent microstructure exhibits identifiable features characteristic of that permanent microstructure (magnetic fingerprint) after practically any magnetic history. See *Spatial Noise Phenomena of Longitudinal Magnetic Recording Media* by Hoinville, Indeck and Muller, *IEEE Transactions on Magnetics*, Volume 28, No. 6, November 1992, the disclosure of which is incorporated herein by reference.

There is a long felt need in the art for a method and apparatus to use this magnetic fingerprint as a means for control for the magnetic medium as it is manufactured and used, i.e. manipulated, throughout its life. There is a wide variety of pre-recorded magnetic media presently being marketed and/or distributed in the United States and throughout the world. Examples of these magnetic media include those produced and sold in the entertainment industry including magneto-optic disks and tapes, cassette tapes, reel-to-reel tapes, video tapes, etc. Still another major market in magnetic media is the tremendous volume of computer programs routinely sold and/or distributed on floppy diskettes. A related market is the magnetic media used in hard disk drives which have met with great commercial success. All of these examples of magnetic media have to be first manufactured and, subsequently, recorded with data which are later retrieved by reading with a magnetic head of some kind. A typical manufacturing process for a thin film magnetic medium would include taking a substrate, such as a Mylar TM film, depositing magnetic material thereon, such as by coating it with a slurry, magnetizing and drying the slurry, and then calendering the substrate, and slitting and rolling the substrate into usable format. After deposition, a fingerprint may be taken and used as a benchmark to control subsequent steps in processing. With this process control, better quality medium may be manufactured. As an example, various steps may actually cause damage to the magnetic media and it is important to ascertain such damage as soon as possible in order to eliminate waste and reduce cost through unnecessary further processing thereof. Furthermore, once the magnetic medium has been manufactured and sold, and placed in service, a user would like to ensure that the magnetic medium is still "good" or that it is being processed without deformation thereof which would corrupt or lose data between recording and playback. An example of the former is when a hard disk drive experiences a "head crash" which can corrupt some or all of the data stored on a hard disk, much to the chagrin of a user. An example of the latter is perhaps best exemplified by playback of analog recorded audio cassette tapes wherein the tape is maintained under tension during both record and playback which, if not consistent, can distort the signal retrieved from the cassette and the sound reproduced thereby.

In order to solve these and other problems in the prior art, the inventors herein have succeeded in developing a method and apparatus for utilizing the unique, deterministic, remanent noise characteristic of the magnetic medium itself as a fingerprint or benchmark to ascertain the integrity of the magnetic medium as it is both processed in manufacturing and later used in the recording and playback of data therefrom. As used herein, the word "data" may include any kind of magnetic recording, analog or digital, and may typically include words, numbers, video, and audio.

This inventive technique relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified which forms the basis of the magnetic recording process. If a region of a magnetic medium is saturated in one direction by a large applied field, the remanent magnetization depends strongly on the microstructure of the medium. This remanent state is deterministic for any point on the recording surface. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations, positions and magnetic properties. The actual deviations will be unique to a region of the medium surface making this orientation a signature or a "fingerprint" of that medium. To reproduce this distribution, intentionally or not, is practically impossible since this would entail a precise manipulation of the orientation of innumerable particles at the submicrometer level. Thus, the orientation and disposition of a large set of particles on a specific portion of a recording surface can uniquely identify that medium. In experiments, the inventors have found that the remanent noise from a length of between about 30 micrometers and 4300 micrometers provides enough data to "fingerprint" a magnetic medium uniquely.

In the manufacturing process, once this "fingerprint" has been established and becomes part of the magnetic medium, it can be used as a benchmark which may later be checked during subsequent steps in the manufacturing process in order to control it and ensure the integrity of the magnetic medium. For example, with continuous tape magnetic medium, a wide web of tape may first be formed and the web then subsequently processed by slitting and calendering into a desired width after which it may be cut to specific lengths and packaged in a final case, carrier, or the like for actual use. Early on in this process, and intermittently throughout the web, a "fingerprint" of a small portion thereof may be determined and stored for later correlation with a "fingerprint" read from the same portion thereof. If the cross-correlation between the two "fingerprints" is high, one can be assured that the integrity of the magnetic medium has not been disturbed. However, if the cross correlation is less than high, then it is highly likely that there has been some change in the magnetic medium which, if not within tolerance, could be indicative of a defective magnetic medium. The original or "benchmark" fingerprint may be stored separately or may itself be magnetically encoded on the magnetic medium at or adjacent to the portion thereof whose fingerprint has been taken.

Subsequent to manufacturing, a magnetic fingerprint may be used in much the same way to monitor the magnetic medium. However, at this stage in its use, the magnetic medium may be reliable enough that the fingerprint may instead be useful in monitoring other parts of the magnetic circuit which are involved in reading and/or writing data to and from the magnetic medium. For example, in a hard disk drive, a fingerprint for a portion of the magnetic hard disk may be magnetically encoded thereon and the head of the hard disk drive may be tested by reading the fingerprint and comparing it with the magnetically encoded, stored fingerprint. A cross-correlation between these two fingerprints may be used to determine how effectively the head is functioning in reading data to and from the magnetic medium of the hard disk. Within certain tolerances, this cross-correlation may produce an error signal which can be used by the electronics in the hard disk drive to "adapt" the head output in order to effectively adjust the head response for wear, etc. Out of tolerance, this cross-correlation may be used to generate an error signal which could warn of impending head failure or other failure in the magnetic circuit.

Still another application of the fingerprint is its use in a magnetic medium comprised of a linear tape which is commonly "tensioned" as data are either read to or written therefrom. As with the other applications, the magnetic fingerprint may be magnetically encoded on the tape itself and cross-correlated with the same magnetic fingerprint as it is read in real time. The cross-correlation may be used to determine the nature of the variation between the fingerprints, i.e. such as a fixed expansion of the fingerprint, which would be indicative of tension being too great in the playback mode. The tension control of the playback device may thus be adjusted to decrease its tension and thereby assure that the same tension is applied to the tape during read as well as write functions. This helps ensure the integrity of the data and its accurate recovery from the magnetic medium.

While the principal advantages and features of the present invention have been described above, a more complete and thorough understanding of the invention may be attained by referring to the drawings and description of the preferred embodiment which follow.

DETAILED DESCRIPTION OF THE PREFERRED EMBODIMENT

Figure 1A:
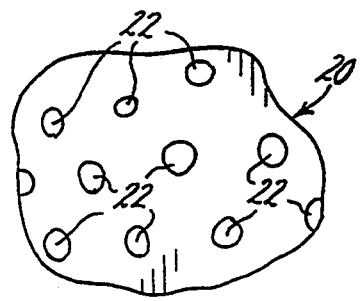
FIG. 1A is a magnified representative depiction of the microscopic structure of a region of magnetic medium.
Figure 2:
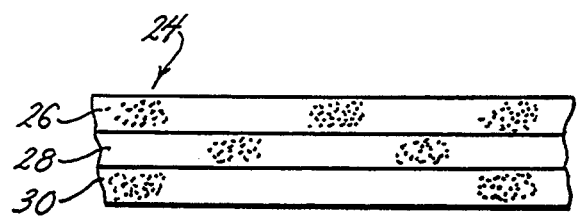
FIG. 2 is a magnified depiction of several tracks of a magnetic medium having microscopic structure representatively shown thereon.

As shown in FIG. 1A, a region of magnetic medium 20 is built up with a plurality of microcrystalline structures 22 in a random pattern. This microcrystalline structure 22 is comprised of particles or grains varying from tens to thousands of Angstroms in diameter. The view of FIG. 1A is greatly magnified in order to depict this physical phenomenon. As shown in FIG. 2, this microcrystalline structure extends throughout the magnetic medium even though the magnetic medium 24 shown in FIG. 2 may be itself comprised of tracks 26, 28, 30 as well known in the art. Although shown schematically as separate regions, the fingerprint can be obtained from any portion of the medium 24.

Figure 1B:
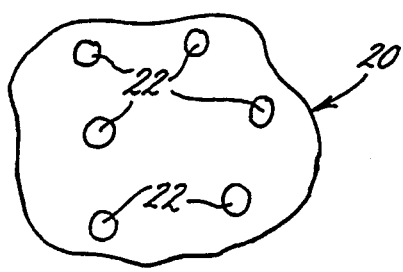
FIG. 1B is a magnified representative depiction of the microscopic structure of the same region in FIG. 1A, after it has been deformed.
Figure 1C:
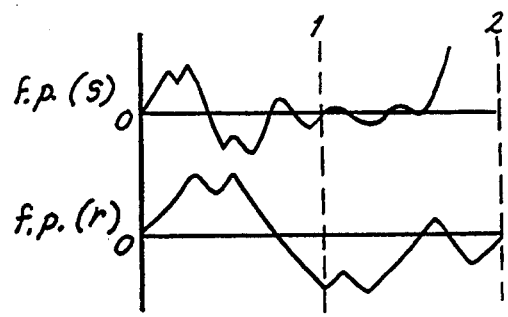
FIG. 1C is a graph of the remanent noise produced by each of the regions depicted in FIGS. 1A and 1B.

As shown in FIG. 1B, the same region of a magnetic medium is shown except that the microcrystalline structures 22 have a greater distance between them as might be experienced in a magnetic medium 20 which has been "stretched" or which is under greater tension such that it has been elastically deformed. This "stretching"

has been exaggerated in the drawings for clarity. This might be most commonly experienced in a tape or other film magnetic medium. In the event that the thin film magnetic medium is stretched, it is expected that the fingerprint will be deformed in a fixed relationship with the original. This is perhaps best explained by referring to FIG. 1C. As shown in the upper portion thereof, the stored fingerprint has a remanent noise which generates a corresponding signal with a unique pattern as shown and which takes the "record" or "playback" time from zero to one. This original fingerprint could very well be the remanent noise from the microcrystalline structure 22 appearing in the region 20 of FIG. 1A. After being stretched or tensioned, the same microcrystalline structure 22 as shown in FIG. 1B could be expected to produce the fingerprint shown in the lower half of FIG. 1C wherein the same general shape is evidenced except that it extends from the origin zero to two in "record" or "playback" time. Using the cross correlation techniques, and especially using the normalized cross-correlation coefficient r, where $$r = \frac{\sum_{i=1}^{N}(x_i - \bar{x})(y_i - \bar{y})}{\sqrt{\sum_{i=1}^{N}(x_i - \bar{x})^2} \sqrt{\sum_{i=1}^{N}(y_i - \bar{y})^2}}$$

as explained by the inventors in their earlier published article mentioned above, and in an iterative comparison between fingerprints, a ratio therebetween may be determined which can be used to control the tension in a playback mode for a thin film medium so as to decrease the tension and thereby cause the microcrystalline structure 22 of FIG. 1B to reassume the shape shown in FIG. 1A. Alternately, in other kinds of magnetic media, or where the thin film medium has been stretched, this cross-correlation may produce an error function which can be used to adapt and correct the electronics and thereby adaptively correct for the physical differences in the magnetic medium from the time of record to the time of playback. This kind of electronic correction or adaptation to a signal after being read from a source is well known in the art and may be uniquely implemented herein to effect the purposes of the present invention.

Figure 3:
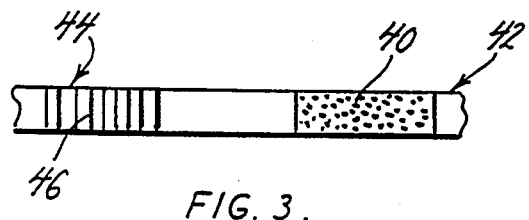
FIG. 3 is a partial view of a track of magnetic media having its fingerprint recorded thereon in machine readable code.
Figure 4:
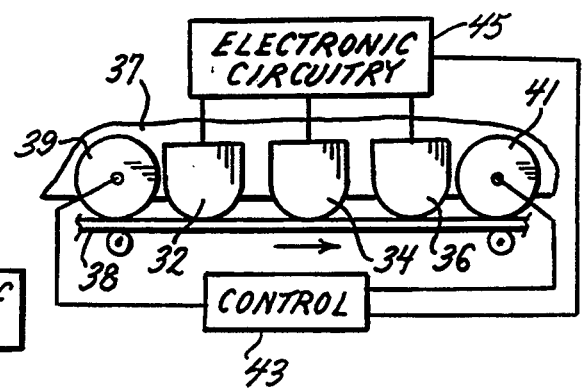
FIG. 4 depicts three conventional recording heads and a magnetic medium traveling thereunder.

Referring now to FIGS. 3 and 4, a plurality of conventional recording heads 32, 34, 36 are shown mounted in a head transport 37 with a traveling magnetic medium 38 controllably driven past recording heads 32, 34, 36 and kept under tension by a pair of capstans 39, 41, all as is well known in the art. These recording heads 32–36 may be any magnetic transducer or magneto-optic transducer head, as known in the art. Recording heads 32–36 are all connected to electronic circuitry 39, as well known in the art, to control and read their input and output and to further process signals for playback or other use. Although only three heads 32, 34, 36 are being shown in FIG. 4, it will be well understood to those of ordinary skill in the art that a plurality of recording heads of any number may just as easily be provided and, as taught herein, may be required in order to effect the purposes of the present invention. As shown in FIG. 3, the magnetic "fingerprint" at a specified region 40 of a thin film magnetic medium or tape 42, shown representationally in FIG. 3 as a thin film tape, may be recorded at a second position 44 on said thin film magnetic medium or tape 42 in a machine readable code 46 or the like.

Still referring to FIGS. 3 and 4, the present invention may be used to control the tension of a traveling magnetic medium 38 by cross-correlating the fingerprints. One of heads 32–36 may be used to read the fingerprint from a portion of the medium 38 (as might correspond to region 40 as shown in FIG. 3) with the magnetically encoded and stored representation of the fingerprint (as might correspond to the machine readable code 46 in FIG. 3). Upon making this cross-correlation, there may be a direct match such that the tension control 43 maintains the relative speeds of capstan drives 39, 41. However, the fingerprints may instead correlate in a relationship somewhat similar to that shown in FIG. 1C, thereby indicating that the tension control 43 needs to reduce the tension applied to the traveling magnetic medium 38. In such event, a signal may be sent by electronic circuitry 39 to the tension control 43 which, in turn, adjusts the relative speeds of capstan drives 39, 41 to lessen the tension and bring the "read" fingerprint into closer correlation with the "stored" fingerprint. The magnetic medium 38 may be characterized intermittently with a fingerprint corresponding to a portion of the magnetic medium 38, at regular or irregular intervals, such that tension control 43 may be continuously adjusted as the magnetic medium 38 travels past the record heads 32–36.

As their preferred embodiment, the inventors have utilized a methodology for reading or determining the remanent noise characteristic of the region 40 of the magnetic medium which is being "fingerprinted". Preferably, this region 40 is on the order of several hundreds of micrometers. This region is then DC saturated and then subjected to a "read" step for determining the remanent noise produced thereby.

While this is the preferred embodiment, it should be understood that the fingerprint is always there, whether the medium has been recorded over or not. Therefore, it is not strictly necessary that the specified portion of medium containing the fingerprint be DC saturated, or DC saturated in the same polarity in order to obtain the fingerprint. Instead, it is only important that the remanent noise be determined in a manner which facilitates its being correlated successfully with the earlier determined remanent noise.

If this information is obtained in a "single shot" measurement, then the results will obviously include both electronics noise as well as the remanent noise attributable to the particles' orientation. As this "noise" or "remanent noise" is electronically determined as an analog signal, this information may then be digitized and recorded with about a hundred to two hundred digital bits of information as may be representationally shown as machine readable code 46 in FIG. 3. In experiments, the inventors have made multiple measurements and averaged their results in order to eliminate the electronics noise present in the measured wave form. However, there was observed a high correlation coefficient when the two sets of data, i.e. single shot and averaged, were compared thereby demonstrating that a single shot reading could readily be used in comparison to an averaged set of data in commercial application.

In order to recover or measure the "fingerprint" or remanent noise, the process is similarly repeated and, when comparing two single shot wave forms, a smaller correlation therebetween was experienced. However, the correlation experienced with two single shot wave forms was significant and clearly demonstrated this method's feasibility for commercial application as well.

Figure 6:
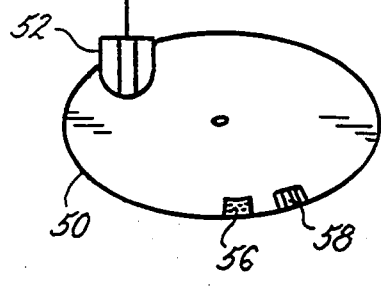
FIG. 6 is a perspective view of a hard disk and head from a hard disk drive.
Figure 5:
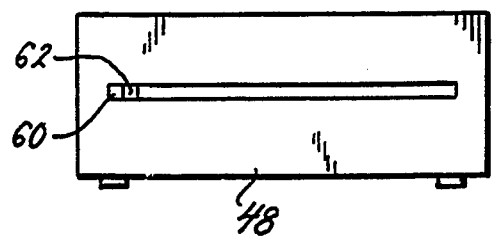
FIG. 5 is a front view of a hard disk drive.

In still another embodiment, a hard disk drive 48 is shown in FIG. 5 and generally includes (as shown in FIG. 6) a hard disk 50 or the like which spins past a read/write head 52 which produces an output to an electronic circuitry 54. As in the other embodiments disclosed herein, a fingerprint portion 56 may be designated on the hard disk 50 and the data corresponding to the fingerprint may be similarly stored at a second location 58 on the same hard disk 50. Over the course of the life of the drive 48, the head 52 may be moved intermittently across the fingerprint portion 56 and a cross-correlation made by the electronic circuitry 54 with the fingerprint as "read" and the fingerprint as stored at fingerprint portion 58. In this particular embodiment, as the hard disk 50 is not generally considered to be subject to the same kinds of stresses as might be experienced in a thin film magnetic medium, the integrity of the hard disk 50 may be assumed and any deterioration in the cross-correlation between the fingerprints may instead be indicative of a deterioration in the magnetic components involving the read/write head 52, or other portions of the magnetic components as is known in the art. If this deterioration is within a pre-determined tolerance band, the electronic circuitry 54 may either ignore the result, or display a positive result for the user such as, for example, by illuminating an indicating light 60 on the case of the hard drive 48. As the correlation deteriorates, the electronic circuitry 54 may adapt for the differences between the two fingerprints, as explained above, or not. Various techniques for adapting for known physical variances in a head 52 or the like are well known and may be readily implemented by those of ordinary skill in the art as uniquely taught herein. At a time when the cross-correlation between fingerprints deteriorates below a pre-determined level, a second pilot light 62 may be illuminated indicating to the user that data storage and retrieval is at risk. At this time, various safeguards may be taken, either manually or automatically, by the drive 48 in order to safeguard data recorded on the hard disk 50. Such safeguards might include limiting further access to the drive, forced backup of all data on the drive, or some other routine. It should also be noted that many drive 48 designs include the capacity to replace hard disk 50 on a routine basis such as is commonly done in removable hard disk drives. In those instances, the present invention may very well be used and implemented to verify the integrity of a hard disk 50 prior to permitting operation of the drive 48. As can be appreciated, removable hard disks 50 are subject to greater abuse, deterioration, wear, etc. which could affect the magnetic microstructure thereon and interfere with effectively recording and reading back data therefrom. In that particular application, a fingerprint portion 56 and fingerprint encoded portion 58 may be replicated across the surface of the hard disk 50 to provide an integrity check throughout the entirety of the hard disk 50.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a device having a head for at least reading data magnetically encoded on a magnetic medium, said device having means for controlling the tension of said magnetic medium as it passes by said head, the improvement comprising means for cross-correlating a magnetic fingerprint of said magnetic medium and controlling said tension control means in response thereto.

2. The device of claim 1 wherein said cross-correlating means includes means for intermittently cross-correlating said magnetic fingerprint as said magnetic medium moves past said head.

3. The device of claim 2 wherein said magnetic medium has its magnetic fingerprint for intermittent portions thereof magnetically encoded thereon, and wherein said cross-correlating means includes means for reading a magnetic fingerprint at said intermittent portions and comparing said read magnetic fingerprint with said magnetic encoded magnetic fingerprint.

4. The device of claim 3 wherein said comparison means includes means for implementing a normalized cross-correlation coefficient r where $$r = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

for determining the degree of similarity between said magnetic fingerprints.

5. A method for controlling the tension of a magnetic medium as magnetically encoded data is at least read therefrom by a head, the method comprising the steps of:

cross-correlating a magnetic fingerprint of said magnetic medium, and controlling the tension of said magnetic medium in response thereto.

6. The method of claim 5 wherein the step of cross-correlating includes the step of:

intermittently cross-correlating a magnetic fingerprint of said magnetic medium as said magnetic medium moves past said head.

7. The method of claim 6 wherein said magnetic medium has its magnetic fingerprint for intermittent portions thereof magnetically encoded thereon, and wherein the step of intermittently cross-correlating includes the steps of:

reading a magnetic fingerprint at intermittent portions of said magnetic medium, and comparing said read magnetic fingerprint with said magnetically encoded fingerprint.

8. The method of claim 7 wherein the step of comparing includes the step of implementing a normalized cross-correlation coefficient r, where $$r = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

for determining the degree of similarity between said magnetic fingerprint.

9. A method for detecting a variation in a magnetic medium as said magnetic medium is manipulated, said method comprising the steps of:

determining a magnetic fingerprint of a portion of said magnetic medium, determining again, after passage of time, a magnetic fingerprint of the same portion of said magnetic medium, and cross-correlating said two magnetic fingerprints to ascertain any differences therebetween, said differences being indicative of a variation over time in said magnetic medium.

10. The method of claim 9 wherein said magnetic medium is a hard disk in a hard disk drive, said hard disk drive including a head for at least reading magnetically encoded data from said hard disk, and wherein the method further comprises the step of storing on said hard disk said magnetic fingerprint and wherein the determining again step includes the step of reading said stored magnetic fingerprint with said head, said differences therebetween being also indicative of a variation in head function.

11. The method of claim 10 further comprising the step of adjusting electronically any data at least read from said hard disk in response to said cross-correlating.

12. The method of claim 10 wherein the step of cross-correlating includes the step of implementing a normalized cross-correlation coefficient r, where $$r = \frac{\sum_{i=1}^{N} (x_i - \bar{x})(y_i - \bar{y})}{\sqrt{\sum_{i=1}^{N} (x_i - \bar{x})^2} \sqrt{\sum_{i=1}^{N} (y_i - \bar{y})^2}}$$

for determining the degree of similarity between said magnetic fingerprint.

13. The method of claim 9 further comprising a step before said step of determining again, said step before comprising processing said magnetic medium.

14. The method of claim 9 wherein the step of cross-correlating includes the step of determining whether there is a fixed relationship between said magnetic fingerprint.

* * * * *